United States Patent Office 2,739,123
Patented Mar. 20, 1956

2,739,123
ANTIOXIDANT COMPOSITIONS

George W. Kennerly, Stamford, and George L. M. Christopher, New Canaan, Conn., assignors to American Cyanamid Company, New York, N. Y., a corporation of Maine No Drawing. Application July 29, 1953,
Serial No. 371,182

5 Claims. (Cl. 252—32.7)

The present invention relates to the stabilization of organic substances against discoloration, polymerization, oxidation, development of rancidity, and other forms of deterioration resulting from the action of atmospheric oxygen thereon. More specifically, the present invention is directed to the novel stabilizers, per se, used for such purposes and to the organic compositions containing the same. Still more specifically, the present invention is concerned with novel stabilizers particularly intended to protect such organic substances at elevated temperatures.

It is well known in the art that the development of such undesirable oxidative effects may be deterred by the addition of small quantities of stabilizers or antioxidants to organic substances which are liable to discoloration, oxidation and other deteriorative effects. Among the organic substances which have been so stabilized have been fats, soaps, oils and waxes of all types; hydraulic fluids; textile softeners; paints and varnishes; petroleum products including lubricating oils, turbine oils, transformer oils, cutting oils, etc.; plastic molding powders; and the like.

An example of such an antioxidant is the class of 2,2'-alkylidene-bis(4,6-disubstituted phenols) which have been found to be extremely advantageous as antioxidants for the above-mentioned materials and particularly for oil compositions, rubber products, and like substances as more fully described in United States Letters Patent 2,538,355, issued January 16, 1951, and 2,570,402, issued October 9, 1951.

As disclosed in these patents and as expanded by the present disclosure, this class of antioxidants posseses the following generic structural formula:

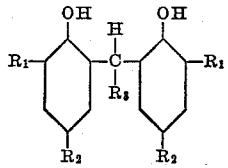

wherein R₁ is an aralkyl radical or a secondary or tertiary alkyl radical containing from 3 to about 12 carbon atoms; R₂ is a primary or secondary alkyl radical containing from 1 to 4 carbon atoms; and R₃ is hydrogen or a primary alkyl group containing from 1 to 3 carbon atoms.

This class of compounds (hereinafter sometimes referred to as type A) has been found generally acceptable to the industry as antioxidants or stabilizers and their use has been varied and widespread. However, successful as they have been, these products do possess some shortcomings and it is a principal object of this invention to overcome such shortcomings and to furnish the industry with an even more acceptable product.

For example, the nature and chemical construction of these compounds is such that their manufacture is not simple or inexpensive and, consequently, the cost economics have militated in some cases against their more widespread use. Therefore, it is another principal object of the present invention to provide a novel composition possessing an equivalent or increased antioxidant or stabilizing effect at decreased cost.

Additionally, in some cases, in an effort to obtain the desired inhibiting results, rather large percentages of the additive, on the order of 5% or higher, are occasionally required. Unfortunately, it could happen that the solubility of the additive in the particular organic substance to be stabilized may not be high enough and consequently optimum results are not obtainable inasmuch as sufficient amounts of the additive could not be incorporated in the organic substance. It is therefore still another principal object of the present invention to provide a novel composition possessing an equivalent or increased antioxidant or stabilizing effect while using decreased amounts of the improvement additive.

We have found that if small amounts of a salt of a diester of dithiophosphoric acid are added to an organic composition containing the 2,2'-alkylidenebis-4,6-disubstituted phenols, a remarkable synergistic effect is noted whereby unexpected and disproportionately increased antioxidant and stabilizing effects are realized, even though the total amount of the improvement additives is drastically reduced.

In this way, the cost of the antioxidants is reduced, particularly due to the relative inexpensiveness of the dithiophosphates; equivalent quantities are found sufficient for more severe purposes; smaller quantities are found sufficient for equivalent purposes; and solubility problems for organic substances are lessened.

These salts of diesters of dithiophosphoric acid (hereinafter sometimes referred to as type B) are well known in the industry and possess the following generic structural formula:

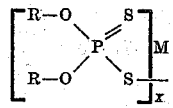

wherein R is a primary or secondary alkyl, aryl or aralkyl radical containing from 1 to 20 carbon atoms; M is a polyvalent metal; and X is the valence of M.

Among the more specific examples of this class of compounds may be cited, as illustrative but not limitative, the metallic salts of: dibutyl dithiophosphoric acid; dihexyl dithiophosphoric acid; di-n-octyl dithiophosphoric acid; dilauryl dithiophosphoric acid; diamyl dithiophosphoric acid; di(4-methylpentyl-2) dithiophosphoric acid; dioctadecyl dithiophosphoric acid; diphenyl dithiophosphoric acid; di-(2,4-diamylphenyl) dithiophosphoric acid; the di-(wax-substituted diaryl) dithiophosphoric acids; the dicycloaliphatic dithiophosphoric acids such as those prepared by reacting cyclopentanol, cyclohexanol, cycloheptanol, and the methyl, ethyl, propyl and amyl substituted cyclopentanol, cyclohexanol and cycloheptanol, etc., with P₂S₅; bis-(2,4-diamylphenoxyethyl) dithiophosphoric acid; di-(lauroylphenyl) dithiophosphoric acid, etc.

These various dithiophosphates are used in the form of their metal salts, such as the alkaline earth metal salts. Among the various metal salts which may be employed are those of the salt-forming radicals: nickel, aluminum, cadmium, tin, zinc, magnesium, calcium, strontium, barium and others.

The proportions and concentrations of each of these constituents may be varied within wide limits and would depend to a great extent upon the specific requirements of the particular organic substance involved. For example, each constituent may be present in an amount as low as about 0.001% or as high as about 5.0% by weight as based on the organic substance. However, the preferable and more common range of usage has been found to be from about 0.0025 to about 2.0% by weight of each constituent as based on the weight of the organic substance.

The invention will be further described in greater detail by the following specific examples. It is to be understood, however, that although these examples may describe in particular detail some of the specific features of the invention, they are given primarily for purposes of illustration and the invention in its broader aspects is not to be construed as limited thereto.

EXAMPLE 1

A representative antioxidant composition comprising 2,2'-methylenebis(4 - methyl - 6-tert-butylphenol), hereinafter called 2246, and zinc di-(4-methylpentyl-2) dithiophosphate, hereinafter called A-70, was used to inhibit the oxidation of a white mineral oil. The test was carried out as follows: 300 grams of the mineral oil was weighed out and to it was added an amount of each additive to bring that additive content up to the value indicated in Table I. The mixture was then placed in a cylindrical glass vessel 40 cm. diameter x 400 cm. height with a fritted-glass air-inlet tube at the bottom and an exit-gas tube at the top. The vessel was then placed in a thermostated bath, controlled at 155° C., and pure nitrogen bubbled through the solution at 200 cc. per minute for 1 hour, during which time the solution reached the bath temperature.

The gas stream was then switched to air at 200 cc. per minute and the time noted. The outlet gas stream was then passed through a paramagnetic type oxygen analyzer, where its oxygen content was measured and recorded as a function of time. The time at which the solution began to absorb oxygen was noted by the rapid drop in the oxygen content of the outlet gas stream. This time can be determined very accurately and was recorded in Table I as the "Induction Period," being the number of hours elapsed between the switch from nitrogen to air, and the rapid drop in the oxygen content of the outlet gas stream.

*Table I*

| Additive | Hours Induction Period |
|---|---|
| None | Less than 1 hour. |
| 0.025% A-70 | 12.7 hours. |
| 0.0033% 2246 | 6.0 hours. |
| 0.025% A-70 plus 0.0033% 2246 | 47.5 hours. |

An analysis of this example would therefore indicate that the number of individual hours of induction period attributable to each separate antioxidant was 12.7 and 6.0 which would lead one to expect the numerical sum of 18.7 hours for the two additives in combination. However, the actual induction period was 47.5 hours, almost three times the anticipated result.

EXAMPLE 2

Using the same test method and the same additives as set forth in Example 1, but in 300 grams of di-(2-ethylhexyl) sebacate at 180° C., the following results were noted:

*Table II*

| Additive | Hours Induction Period |
|---|---|
| None | Less than 1 hour. |
| 0.32% A-70 | 15 hours. |
| 0.16% 2246 | 3 hours. |
| 0.08% A-70+0.08% 2246 | 42 hours. |

In this example, the amount of A-70 used in the combined additive was reduced to 25% of the amount present in the individual additive test and the amount of 2246 in the combined additive was 50% of the amount present in the individual run. The sum of the individual additives was 18 hours, whereas the combined additive (in lesser concentrations) had an induction period of 42 hours. Again, many times the anticipated results were obtained and with drastically reduced concentrations.

EXAMPLE 3

Using the same test method as set forth in Example 1, the synergistic effects of 2246 and zinc di-(2-methylpentyl-1) dithiophosphate were studied in white mineral oil at 180° C.

*Table III*

| Additive | Hours Induction Period |
|---|---|
| None | Less than 1 hour. |
| 0.20% dithiophosphate | 4 hours. |
| 0.20% 2246 | 14.5 hours. |
| 0.10% dithiophosphate +0.10% 2246 | 31.5 hours. |

EXAMPLE 4

Using the same test method as set forth in Example 1, the combination of 2,2'-methylenebis-(4-methyl-6-tert-octylphenol) (A) and A-70 (B) was studied in white mineral oil at 155° C.

*Table IV*

| Additive | Hours Induction Period |
|---|---|
| None | Less than 1 hour. |
| 0.0066% A | 9.5 hours. |
| 0.025% B | 12.7 hours. |
| 0.0066% A plus 0.025% B | 65.5 hours. |

EXAMPLE 5

Using the same test method set forth in Example 1, but using the combination of 2,2'-ethylidenebis-(4-methyl-6-tert-butylphenol) (A) plus A-70 (B) in white mineral oil at 155° C., the following results were obtained:

*Table V*

| Additive | Hours Induction Period |
|---|---|
| None | Less than 1 hour. |
| 0.0066% A | 9.5 hours. |
| 0.025% B | 12.7 hours. |
| 0.0066% A+0.025% B | 52.0 hours. |

EXAMPLE 6

Using the same test method set forth in Example 1, but employing 2,2' - methylenebis(4-methyl-6-(α-phenylethyl)phenol) (A) plus A-70 (B) in white mineral oil at 155° C., the following results were obtained:

*Table VI*

| Additive | Hours Induction Period |
|---|---|
| None | Less than 1 hour. |
| 0.0066% A | 2.5 hours. |
| 0.025% B | 12.7 hours. |
| 0.0066% A+0.025% B | 47.0 hours. |

EXAMPLE 7

Using the same test method set forth in Example 1, but using 2246 (A) plus barium di-(n-octadecyl) dithiophosphate (B) in white mineral oil at 155° C., the following results were obtained:

*Table VII*

| Additive | Hours Induction Period |
|---|---|
| None | Less than 1 hour. |
| 0.0066% A | 12.7 hours. |
| 0.025% B | 20.0 hours. |
| 0.0066% A+0.025% B | 51.0 hours. |

EXAMPLE 8

The same procedure described in Example 1 was followed with a combination of 2,2'-methylenebis(4-ethyl-6-tert-butyl phenol), hereinafter called Ethyl 2246, and A-70 at 155° C. in white mineral oil.

Table VIII

| Additive | Hours Induction Period |
|---|---|
| None | Less than 1 hour. |
| 0.0066% Ethyl 2246 | 15.0 hours. |
| 0.025% A-70 | 12.7 hours. |
| 0.0066% Ethyl 2246+0.025% A-70 | 42.5 hours. |

EXAMPLE 9

Using the same test method set forth in Example 1, but using a temperature of 155° C., the combination of 2,2'-methylenebis-(4-methyl-6-t-butyl phenol) and a zinc dihexyl dithiophosphate was used in a paraffin wax. Comparable results to those set forth in Example 1 were obtained.

EXAMPLE 10

L-4 ENGINE TEST IN HAVOLINE 30 OIL

| Composition | Average Piston Rating | Over-all Cleanliness Rating | Final Neut. No. | Percent Viscosity Increase |
|---|---|---|---|---|
| 0.3% A-70 | 8.6 | 97.5 | 4.6 | 100 |
| 0.5% 2246 | 6.7 | 91.7 | 2.3 | 41 |
| 0.25% A-70+0.05% 2246 | 9.0 | 95.8 | 1.1 | 27 |

In the L-4 engine test, the engine is operated continuously for 36 hours at 30 horsepower loading with the crankcase oil temperature at approximately 280° F. and a water jacket outlet temperature of 200° F. The engine is then disassembled and all the parts are inspected and rated. The amount of varnish on the pistons is reported on a scale of from one to ten, in which 10 means a perfectly clean piston and 1 means a piston which is very dirty with stuck piston rings. The overall rating is reported on a scale from 1 to 100 in which 100 means a perfectly clean engine with no sludge deposits and with clean pistons. This test is, of course, an excellent means of determining the oxidative stability of the lubricating oil as protected by the included additive.

The antioxidant compositions of the present invention have been found to be particularly effective at temperatures in excess of 100° C. and the synergistic effect is truly marked at more elevated temperatures. Consequently, the additives herein described are particularly applicable to those cases wherein an organic substance, such as a paraffin wax or a cutting oil, is intended to be used at elevated temperatures.

Although we have described but a few specific examples of our inventive concept and a few results of tests thereon, we consider the invention not to be limited thereto and that suitable changes, variations and modifications may be made without departing from the spirit and scope of the invention.

We claim:

1. A composition comprising an organic substance from the group consisting of mineral oils and waxes subject to oxidative deterioration in organic substances due to the action of atmospheric oxygen and, as an antioxidant therefor, from about 0.0025% to about 5% by weight of comprising a synergistic material consisting of a 2,2'-alkylidenebis(4,6-disubstituted phenol) having the following structural formula:

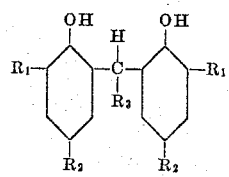

wherein $R_1$ is a member of the group consisting of aralkyl and secondary and tertiary alkyl radicals having from 3 to 12 carbon atoms; $R_2$ is a member of the group consisting of primary and secondary alkyl radicals having from 1 to 4 carbon atoms; and $R_3$ is a member of the group consisting of hydrogen and primary alkyl radicals having from 1 to 3 carbon atoms, and from about 0.0025% to about 5% by weight of a salt of a diester of dithiophosphoric acid having the following structural formula:

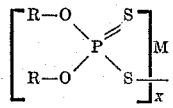

wherein R is a member of the group consisting of primary and secondary alkyl and cycloalkyl radicals having from 1 to 20 carbon atoms; M is a polyvalent metal from the group consisting of barium and zinc; and X is the valence of M.

2. A composition comprising an organic substance from the group consisting of mineral oils and waxes subject to oxidative deterioration in organic substances due to the action of atmospheric oxygen and, as an antioxidant therefor, from about 0.0025% to about 5% by weight of comprising a 2,2'-alkylidenebis(4,6-dialkyl phenol) and from about 0.0025% to about 5% by weight of a polyvalent metal salt of a dialkyl dithiophosphate.

3. A composition comprising an organic substance from the group consisting of mineral oils and waxes subject to oxidative deterioration in organic substances due to the action of atmospheric oxygen and, as an antioxidant therefor, from about 0.0025% to about 5% by weight of comprising 2,2' - methylenebis(4 - methyl-6-tert-butylphenol) and from about 0.0025% to about 5% by weight of zinc di-(4-methyl-pentyl-2) dithiophosphate.

4. A composition comprising an organic substance from the group consisting of mineral oils and waxes subject to oxidative deterioration in organic substances due to the action of atmospheric oxygen and, as an antioxidant therefor, from about 0.0025% to about 5% by weight of comprising 2,2'-methylenebis(4-ethyl-6-tert-butylphenol) and from about 0.0025% to about 5% by weight of zinc di-(4-methyl-pentyl-2) dithiophosphate.

5. A composition comprising an organic substance from the group consisting of mineral oils and waxes subject to oxidative deterioration due to the action of atmospheric oxygen and, as an antioxidant therefor, from about 0.0025% to about 5% by weight of a 2,2'-methylene bis(4-alkyl-6-tert-butyl phenol) and from about 0.0025% to about 5% by weight of zinc di-(4-methyl-pentyl-2) dithiophosphate, said alkyl group containing less than three carbon atoms.

References Cited in the file of this patent

UNITED STATES PATENTS

| | | |
|---|---|---|
| 2,481,487 | Adelson | Sept. 13, 1949 |
| 2,552,570 | McNab et al. | May 15, 1951 |
| 2,595,170 | Rudel et al. | Apr. 29, 1952 |